US008466802B2

(12) United States Patent
Stollberg

(10) Patent No.: US 8,466,802 B2
(45) Date of Patent: Jun. 18, 2013

(54) MANUAL CONNECTING DEVICE

(75) Inventor: Andreas Stollberg, Oberdoria (DE)

(73) Assignee: Siemens Aktiengesellschaft, Munich (DE)

( * ) Notice: Subject to any disclaimer, the term of this patent is extended or adjusted under 35 U.S.C. 154(b) by 333 days.

(21) Appl. No.: 12/922,064

(22) PCT Filed: Mar. 13, 2008

(86) PCT No.: PCT/EP2008/002121

§ 371 (c)(1),
(2), (4) Date: Sep. 10, 2010

(87) PCT Pub. No.: WO2009/112058

PCT Pub. Date: Sep. 17, 2009

(65) Prior Publication Data

US 2011/0001630 A1 Jan. 6, 2011

(51) Int. Cl.
*G08B 21/00* (2006.01)
*H04N 7/18* (2006.01)

(52) U.S. Cl.
USPC ............. 340/687; 348/95; 348/116; 348/129; 348/130; 348/161; 340/686.4

(58) Field of Classification Search
USPC . 340/687, 686, 686.4; 348/135–143; 439/374
See application file for complete search history.

(56) References Cited

U.S. PATENT DOCUMENTS 4,056,762 A * 11/1977 Schadlich ..................... 318/484
4,642,874 A * 2/1987 Litehizer, Jr. ................ 29/566.4
4,731,663 A 3/1988 Kovalchick et al.
4,925,309 A * 5/1990 Endo et al. ..................... 356/394
5,121,438 A * 6/1992 Kawauchi et al. ............ 382/141
5,162,792 A * 11/1992 Morris ............................ 340/2.1
5,419,025 A 5/1995 Murakami et al.
5,583,948 A * 12/1996 Shibayama ................... 382/141
5,642,158 A * 6/1997 Petry et al. ....................... 348/87
5,727,312 A * 3/1998 Maejima et al. ................ 29/857
5,751,847 A 5/1998 Wuyts
5,888,089 A * 3/1999 Konoya et al. ................ 439/404
6,061,466 A * 5/2000 Takubo et al. ................ 382/146
6,381,831 B1 5/2002 Suzuki
7,791,863 B2 * 9/2010 Strackbein et al. ........... 361/622
2003/0196320 A1 10/2003 Ikeda et al.
2004/0032497 A1 * 2/2004 Ying et al. ................. 348/207.1
2008/0100456 A1 * 5/2008 Downie et al. ............. 340/572.8

FOREIGN PATENT DOCUMENTS

DE 4301043 C1 5/1994
EP 0600415 A1 6/1994
EP 1056167 A2 11/2000
EP 1355389 A2 10/2003
WO 9512806 A1 5/1995

* cited by examiner

*Primary Examiner* — Benjamin C Lee
*Assistant Examiner* — Thomas Duah
(74) *Attorney, Agent, or Firm* — Laurence A. Greenberg; Werner H. Sterner; Ralph E. Locher

(57) ABSTRACT

A manual connecting device includes a connecting tool to be guided manually for connecting a connection to a predetermined connecting point, in particular to a predetermined connecting point in an electrical switchgear cabinet or in an electrical control cabinet. The connecting device also includes a camera and an image processing device connected to the camera. The device is suitable for detecting a respective connecting point before, during or after connecting and for generating an alarm signal if the detected connecting point deviates from the predetermined connecting point.

10 Claims, 6 Drawing Sheets

MANUAL CONNECTING DEVICE

Background of the Invention

1. Field of the Invention

The invention relates to a manual connecting device having a connecting tool, which is to be guided manually, for connecting a connection to a prespecified connecting point, in particular to a prespecified connecting point in an electrical control cabinet or an electrical switchgear cabinet.

Connecting devices of this kind can comprise a motor-driven screwdriver or a fitting tool for insulation-displacement connection technology or be formed by such elements. They are used, for example, to connect electrical connections in an electrical control cabinet or switchgear cabinet.

2. Brief Summary of the Invention

The invention is based on the object of specifying a manual connecting device with which faults during connection of connections to prespecified connecting points can be prevented, or at least reduced.

According to the invention, this object is achieved by a manual connecting device having a connecting tool, which is to be guided manually, for connecting a connection to a prespecified connecting point, in particular to a prespecified connecting point in an electrical control cabinet or in an electrical switchgear cabinet. The connecting device has a camera and an image-processing device which is connected to the camera and which is suitable for identifying the respective connecting point before, during or after connection, and for generating an alarm signal if the identified connecting point deviates from the prespecified connecting point.

According to the invention, provision is accordingly made for the connecting device to have a camera and an image-processing device which is connected to the camera and which is suitable for identifying the respective connecting point before, during or after connection, and for generating an alarm signal if the identified connecting point deviates from the prespecified connecting point.

One substantial advantage of the connecting device according to the invention is that it displays a fault to a user if a connection is accidently connected to an incorrect connecting point.

According to one particularly preferred refinement of the connecting device, provision is made for the image-processing device to be suitable for identifying the connection which is to be connected or a coding which is present on the connection; for a memory to be connected to the image-processing device, the respective prespecified connecting point for the connections which are to be connected or for the codings of the connections which are to be connected being stored in said memory; and for the image-processing device to be designed in such a way that, after the respective connection or the coding which is present on the respective connection is identified, said image-processing device reads out the associated connecting point from the memory and treats said associated connecting point as the respectively prespecified connecting point and uses it to generate the alarm signal. This refinement is preferably employed if the connections which are to be connected are different and can be mixed up and should be identified before the connection process for the purpose of distinguishing between them.

According to another particularly preferred refinement of the connecting device, provision is made for a memory to be connected to the image-processing device, a prespecified execution plan which prespecifies the order of the connecting points during connection of the connections being stored in said memory, and the image-processing device being suitable for checking whether the respectively identified connecting point matches the connecting point in accordance with the prespecified execution plan. The last-mentioned refinement is preferably employed when the connections which are to be connected are formed by roll material and the risk of confusion with respect to the order of the connections is precluded because the roll firmly prespecifies the respective connection which is to be connected.

A display device which is activated by the image-processing device is preferably connected to the image-processing device, with the image-processing device preferably checking, after the connection is connected to the prespecified connecting point, which next connecting point has to be provided with a connection in accordance with the prespecified execution plan, and activating the display device in such a way that said display device marks the respectively next connecting point after connection to the prespecified connecting point has taken place.

The display device can be formed, for example, by a separate component which can be fitted in a stationary manner and is connected to a part of the connecting device which is to be guided manually. As an alternative, the display device can also be fitted to that part of the connecting device which is to be guided manually, and therefore can be moved.

The camera preferably also has an associated lighting device which illuminates the field of view of the camera.

With respect to the use of the connecting device when wiring electrical switchgear cabinets, it is considered advantageous if the connecting tool is suitable for connecting electrical connections, in particular core end sleeves, wire ends as such —pressed or unpressed—or round eyelets.

BRIEF DESCRIPTION OF THE SEVERAL VIEWS OF THE DRAWING

The invention will be explained in greater detail below with reference to exemplary embodiments; in the drawing, by way of example.

DESCRIPTION OF THE INVENTION

For the sake of clarity, the same reference symbols are always used for identical or comparable components throughout FIGS. 1 to 6.

Figure 1:
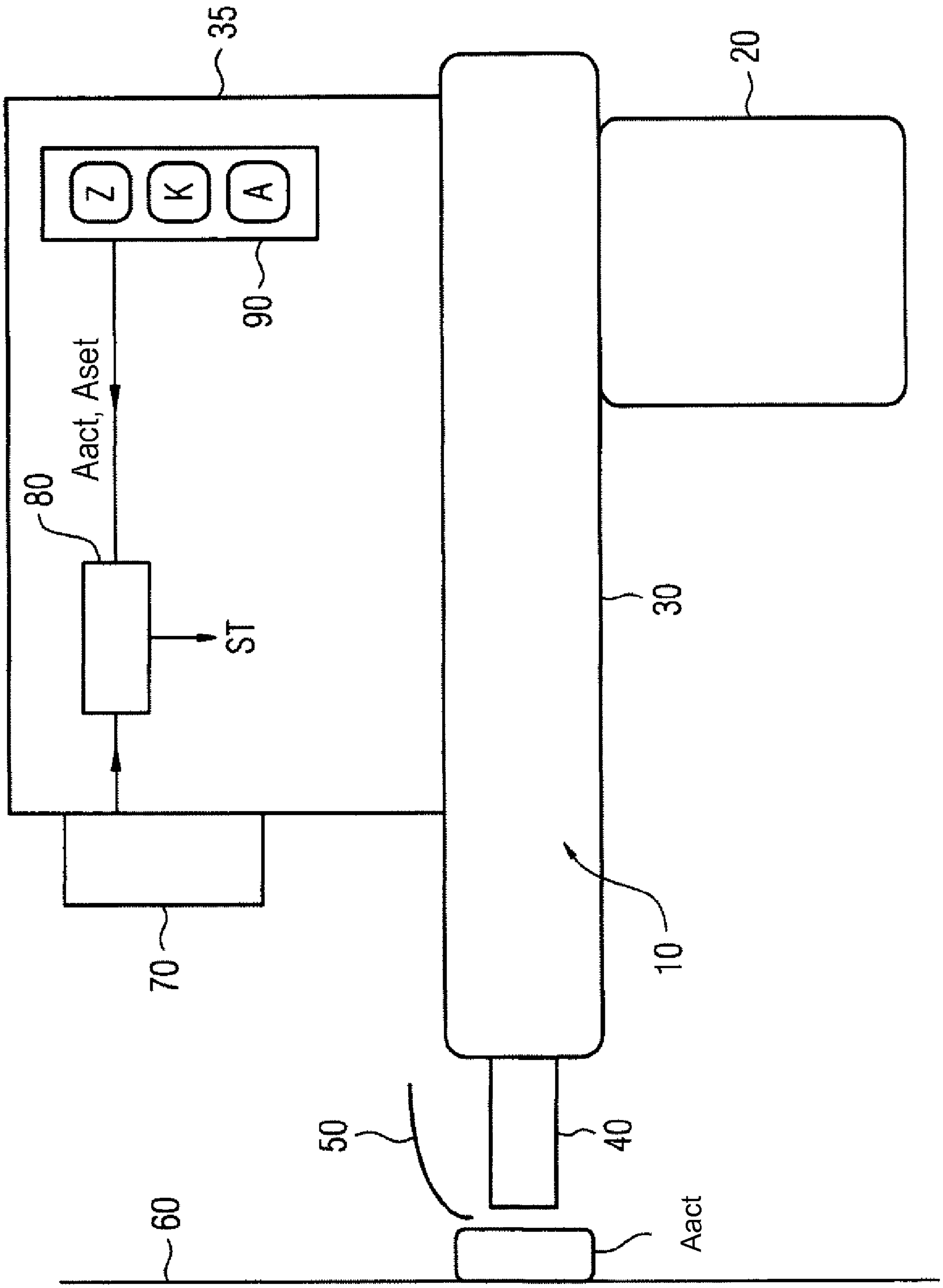
FIG. 1 shows a first exemplary embodiment of a connecting device according to the invention without a display device.

FIG. 1 shows an exemplary embodiment of a manual connection device 10 (not illustrated to scale) which is equipped with a handle 20, a housing 30, a housing attachment 35 and also with a connecting tool 40. The manual connecting device 10 may be, for example, a motor-driven screwdriver or a fitting tool for insulation-displacement connection technology.

A connection 50, which may be, for example, an electrical connection—for example in the form of a core end sleeve, a wire end or a round eyelet—can be connected by the connecting tool 40 to a predefined connecting point Aset. The connecting point Aset may be located, for example, in an electrical switchgear cabinet 60 or the like.

The connection device 10 has a camera 70 and an image-processing device 80 which is connected to the camera 70. The image-processing device 80 is connected to a memory 90 in which the association between the connections 50 which are to be connected and the respectively associated connecting points Aset is stored. The corresponding memory area in the memory 90 is designated Z.

The image-processing device 80 is designed in such a way that it evaluates the images from the camera 70 and can identify the respective connection 50 which is to be connected or a coding which is present on the connection. To this end, said image-processing device accesses a memory area K in the memory 90 in which the image information relating to the connections and/or the codings on said connections is stored. This image information allows the respective connection 50 to be identified.

The image-processing device 80 then interrogates the memory 90 and determines the associated connecting point Aset for the respective connection 50 by accessing the above-mentioned memory area Z.

In addition, the image-processing device 80 evaluates the images from the camera 70 to find the connecting point Aact at which the user of the manual connecting device 10 actually just connects or has already connected the connection. To this end, said image-processing device accesses a memory area A in the memory 90 in which image information relating to the possible connecting points—that is to say, for example, all of the connecting points in the switchgear cabinet in the case of an electrical switchgear cabinet—is stored, and identifies the actual connecting point Aact taking into consideration the memory area A. Location markers or location codings which are provided on or in the vicinity of the respective connecting point and are taken into consideration in the memory area A can, for example, also be used for the purpose of identifying the connection point Aact.

The image-processing device then compares the actual connecting point Aact with the connecting point Aset which is associated with the respective connection 50 which is to be connected and generates an alarm signal ST if the identified connecting point Aact to which the respective connection 50 is just connected or has been connected deviates from the prespecified connecting point Aset. The alarm signal ST may be, for example, an audible or visual alarm signal.

Figure 2:
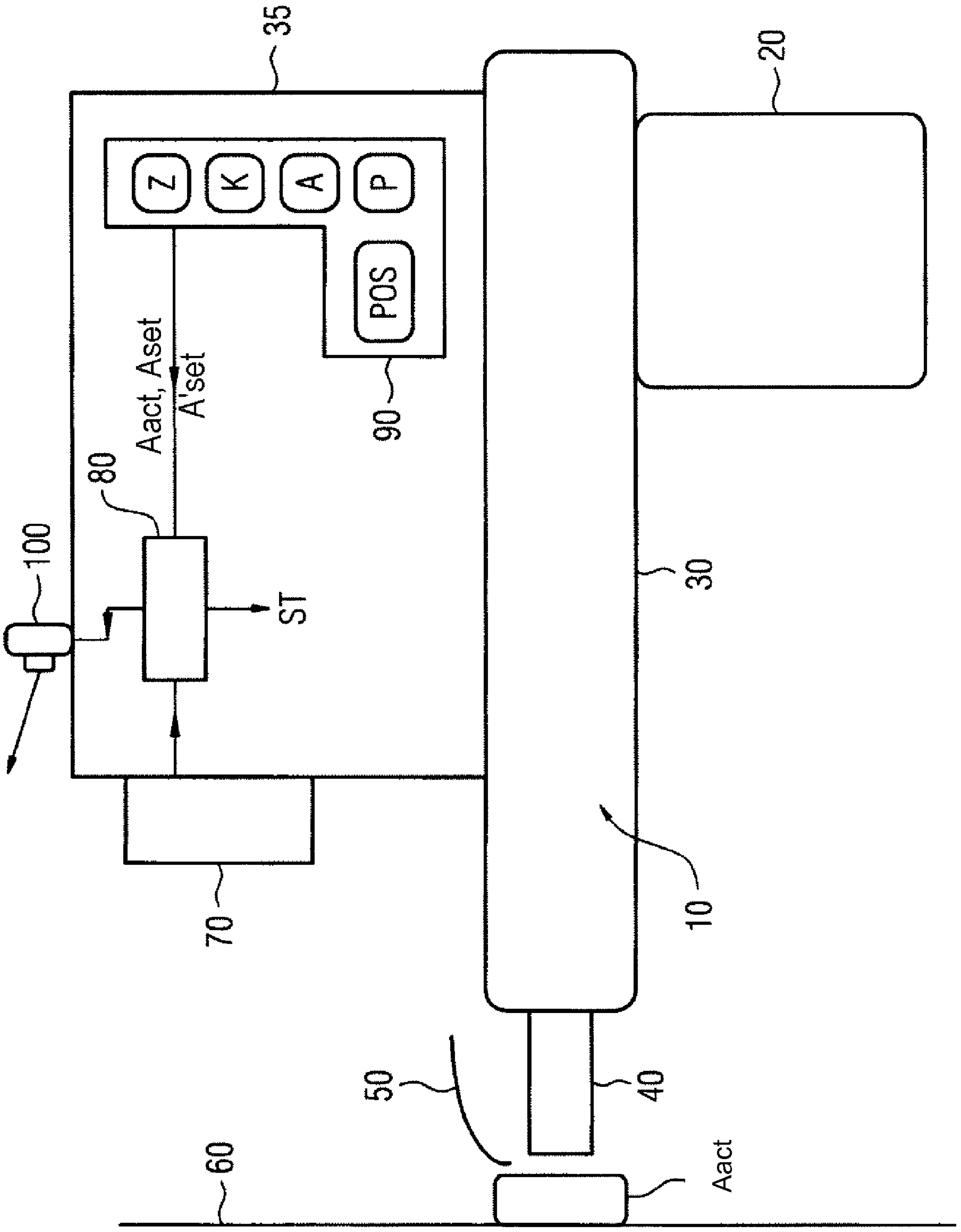
FIG. 2 shows a second exemplary embodiment of a connecting device according to the invention with a stationary display device.

FIG. 2 shows a second exemplary embodiment of a manual connecting device 10 (not illustrated to scale). In this exemplary embodiment, a memory area P is also present in the memory 90, a prespecified execution plan which prespecifies the order of the connecting points Aset during connection of the connections 50 being stored in said memory area P.

A display device 100 is also connected to the image-processing device 80 and is activated by the image-processing device 80. The display device 100 is connected, for example, to the housing 30 or to the housing attachment 35, so that it moves together with the connecting device 10.

After connection of the connection 50 to the prespecified connecting point Aset, the image-processing device 80 checks which next connecting point A'set has to be provided with a connection in accordance with the prespecified execution plan by reading the memory area P. Said image-processing device then activates the display device 100 in such a way that it visually marks the respectively next connecting point A'set after the connection 50 is connected to the prespecified connecting point Aset. To this end, the display device 100 can have, for example, a lamp, a light-emitting diode or a laser which is fitted to an adjusting mechanism and of which the lighting direction can be adjusted. As an alternative, the lighting direction can also be adjusted using adjustable mirrors. In order to be able to correspondingly control the display device 100, the image-processing device 80 is preferably designed in such a way that it can determine its respective position and spatial orientation itself on the basis of the images from the camera 70 and on the basis of spatial position and orientation data POS contained in the memory 90.

Figure 3:
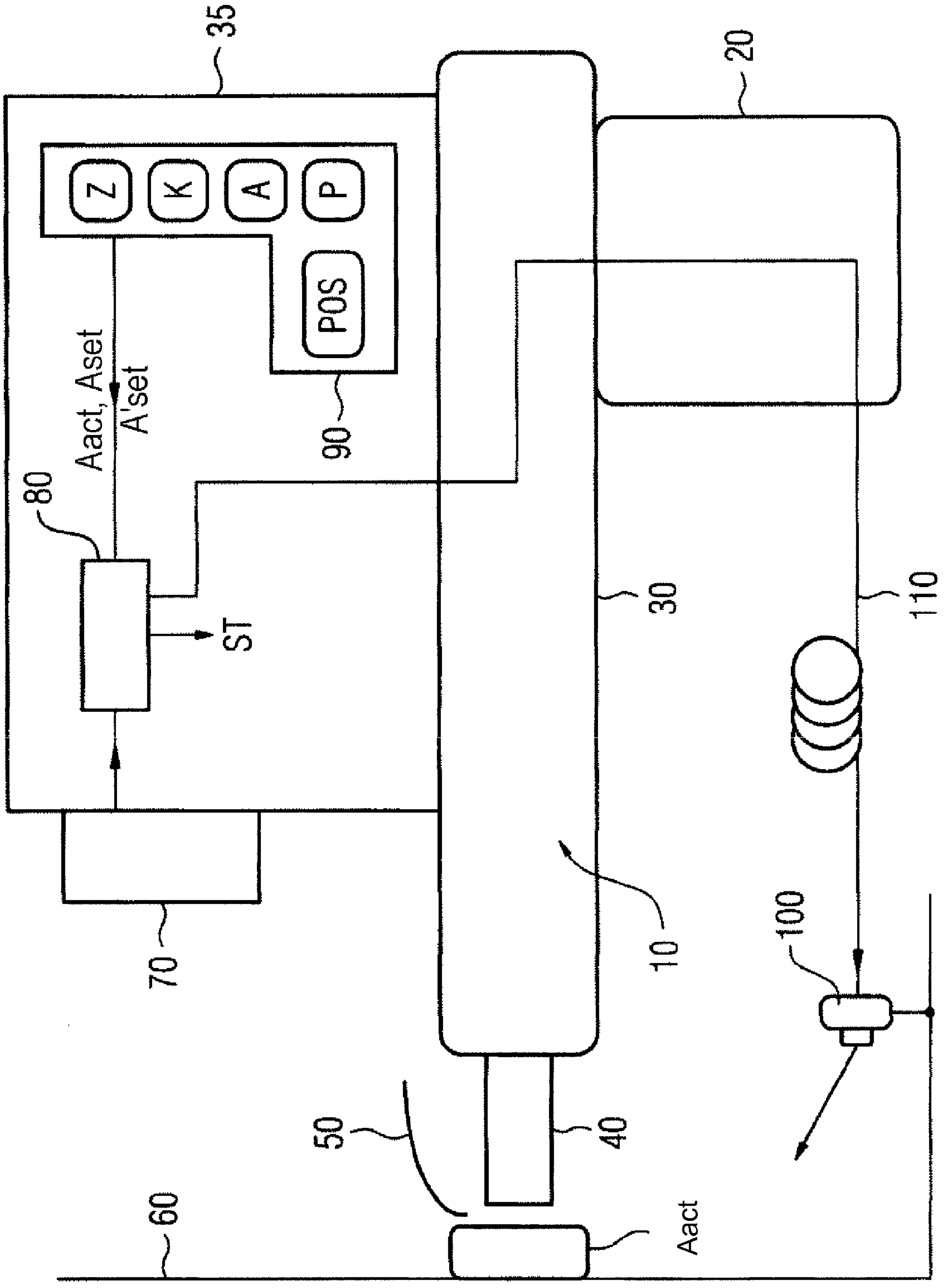
FIG. 3 shows a third exemplary embodiment of a connecting device according to the invention with a stationary display device.

FIG. 3 shows a third exemplary embodiment of a manual connecting device 10 (not illustrated to scale). In this exemplary embodiment, the display device 100 is not connected to the housing 30 which can be moved manually, but rather is stationary. Data can be transmitted between the display device 100 and the image-processing device 80 in a wired manner—as indicated in FIG. 3 by the cable 110—or, as an alternative, by radio.

Figure 4:
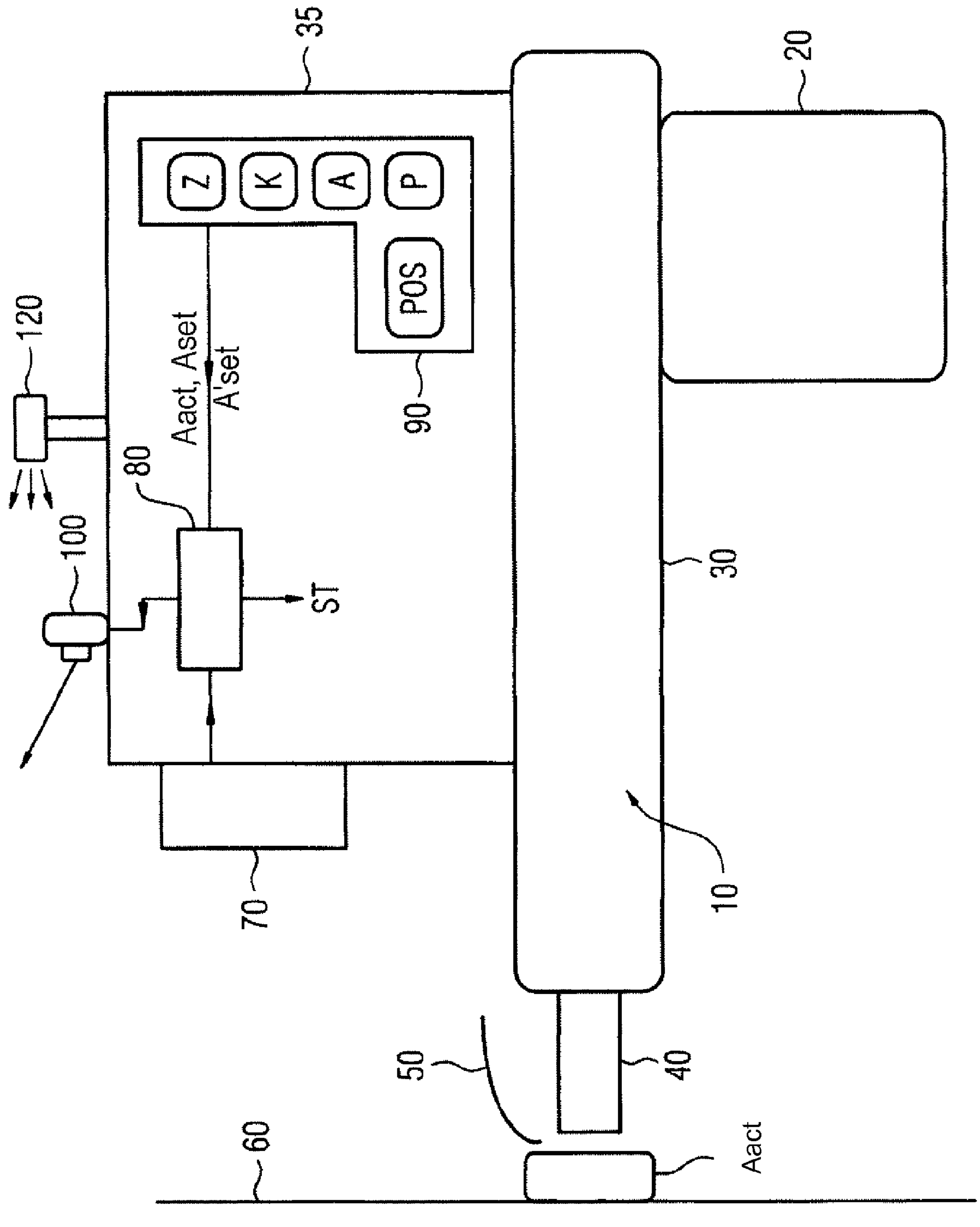
FIG. 4 shows a fourth exemplary embodiment of a connecting device according to the invention with a lamp.

FIG. 4 shows a fourth exemplary embodiment of a manual connecting device 10 (not illustrated to scale). In this exemplary embodiment, a lamp 120 which illuminates the field of view of the camera is additionally present.

Figure 5:
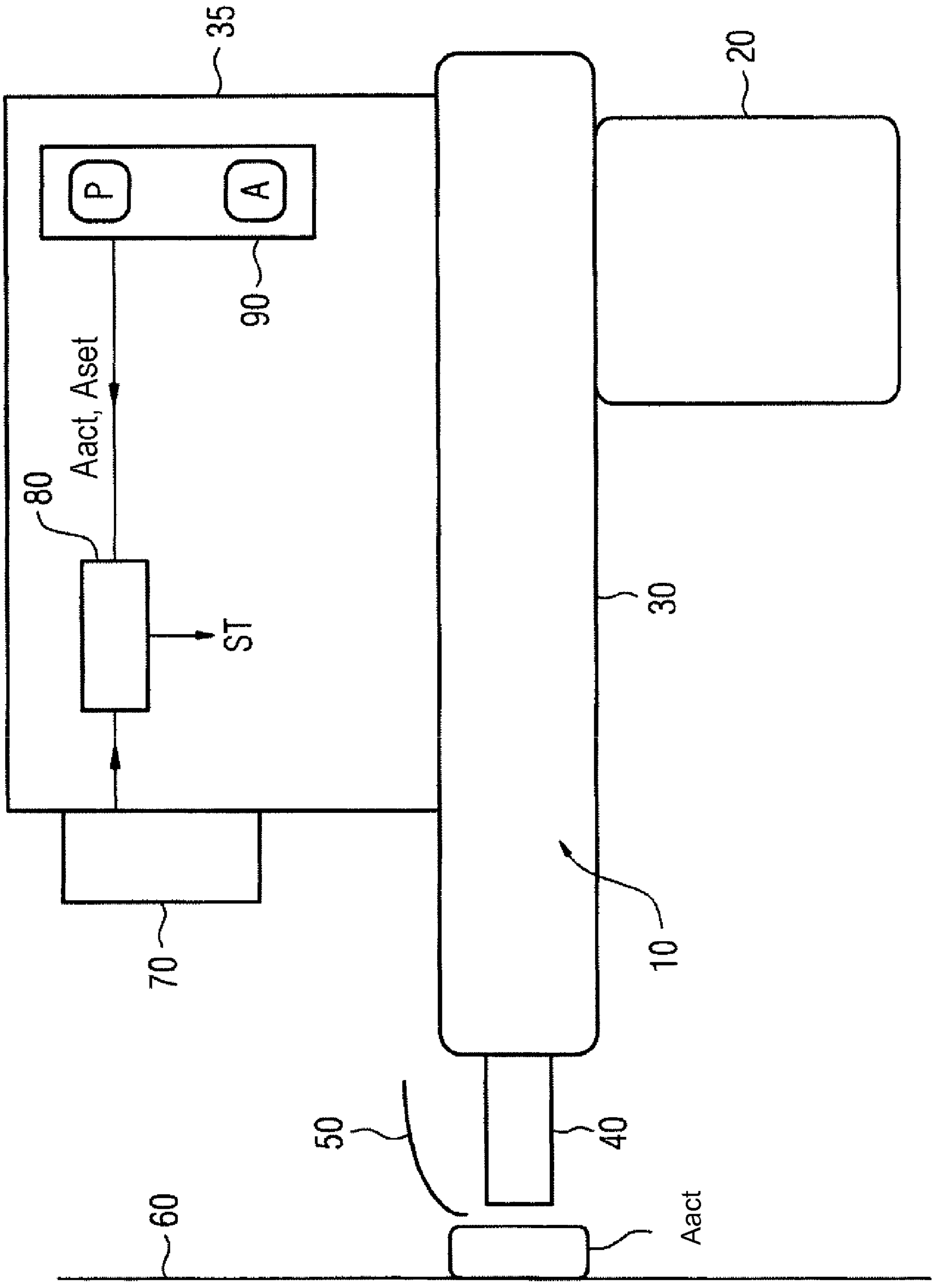
FIG. 5 shows a fifth exemplary embodiment of a connecting device according to the invention.

FIG. 5 shows a fifth exemplary embodiment of a manual connecting device 10 (not illustrated to scale). In this exemplary embodiment, there is no memory area K, and therefore the image-processing device 80 cannot identify the respective connection 50 or the coding on said connection.

The image-processing device 80 is therefore designed in such a way that it only evaluates the images from the camera 70 with respect to the respective connecting points Aact on the basis of the memory area A, and otherwise takes into account the memory area P in which the execution plan which prespecifies the order of the connecting points Aset during connection of the connections 50 is stored. After connection of each connection 50 to the respective connecting point $A_{act}$, the image-processing device 80 accordingly checks whether this connecting point matches the previous connecting point in accordance with the execution plan: if this is not the case, the alarm signal ST is generated.

Figure 6:
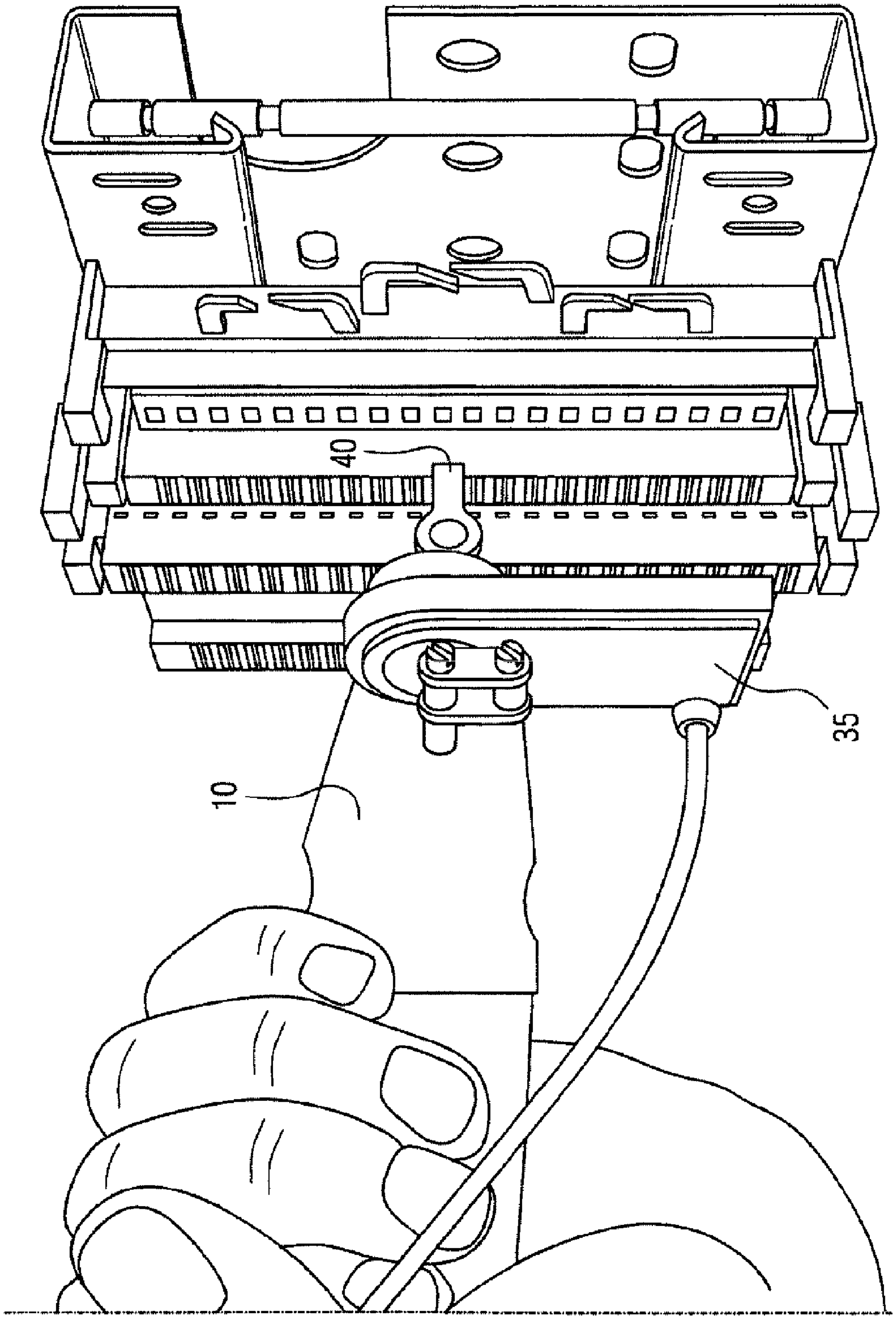
FIG. 6 shows a sixth exemplary embodiment of a connecting device according to the invention.

FIG. 6 shows a sixth exemplary embodiment, specifically in an illustration drawn approximately to scale. Reference is made to the above exemplary embodiments in conjunction with FIGS. 1 to 5 in relation to preferred refinements of the manual connecting device according to FIG. 6.

The invention claimed is:

1. A manual connecting device, comprising:

a connecting tool to be guided manually for connecting a connection to a prespecified connecting point in an electrical control cabinet or in an electrical switchgear cabinet;

a camera; and an image-processing device connected to said camera, said image-processing device being configured for identifying a respective connecting point before, during or after a connection and for generating an alarm signal if the identified connecting point deviates from the prespecified connecting point.

2. The manual connecting device according to claim 1, which further comprises:

a memory connected to said image-processing device;

said image-processing device being configured for identifying the connection to be connected or a coding disposed on the connection;

said memory storing a respective prespecified connecting point for the connections to be connected or for the codings of the connections to be connected; and said image-processing device being configured for reading an associated connecting point from said memory and using the associated connecting point as the respectively prespecified connecting point for generating the alarm signal, after identifying the respective connection or the coding disposed on the respective connection.

3. The manual connecting device according to claim 1, which further comprises:

a memory connected to said image-processing device, said memory storing a prespecified execution plan prespecifying an order of the connecting points during connection of the connections; and said image-processing device being configured for checking if the respectively identified connecting point matches the respectively prespecified connecting point in accordance with the prespecified execution plan.

4. The manual connecting device according to claim 3, which further comprises:

a display device being connected to and activated by said image-processing device;

said image-processing device checking, after the connection is connected to the prespecified connecting point, which next connecting point has to be provided with a connection in accordance with the prespecified execution plan, and activating said display device for marking the respectively next connecting point with said display device after connection to the prespecified connecting point has taken place.

5. The manual connecting device according to claim 4, which further comprises:

a part to be manually guided;

said display device forming a separate component to be fitted in a stationary manner and connected to said part to be manually guided.

6. The manual connecting device according to claim 4, which further comprises:

a part to be manually guided;

said display device being fitted to said part to be manually guided.

7. The manual connecting device according to claim 1, wherein said camera has an associated lighting device illuminating a field of view of said camera.

8. The manual connecting device according to claim 1, wherein said connecting tool is a motor-driven screwdriver or a fitting tool for insulation-displacement connection technology.

9. The manual connecting device according to claim 1, wherein said connecting tool is configured for connecting electrical connections.

10. The manual connecting device according to claim 9, wherein the electrical connections are core end sleeves, pressed or unpressed wire ends or round eyelets.

* * * * *